United States Patent [19]

Henn et al.

[11] Patent Number: 5,340,916
[45] Date of Patent: Aug. 23, 1994

[54] POLYOXYPROPYLENE-POLYOLS AND POLYOXYPROPYLENE-POLYOXYETHYLENE-POLYOLS CONTAINING HYDROXYL GROUPS

[75] Inventors: Rolf Henn, Ketsch; Werner Hinz, Frankenthal; Ludwig Schuster, Limburgerhof; Klaus Vorspohl, Ludwigshafen, all of Fed. Rep. of Germany

[73] Assignee: BASF Aktiengesellschaft, Ludwigshafen, Fed. Rep. of Germany

[21] Appl. No.: 966,228

[22] Filed: Oct. 26, 1992

Related U.S. Application Data

[62] Division of Ser. No. 694,621, May 2, 1991, Pat. No. 5,192,813.

[51] Int. Cl.$^5$ .................. C07C 43/10; C08G 65/08
[52] U.S. Cl. .................. 528/405; 252/182.27; 528/419; 528/421; 528/425; 568/619; 568/620; 568/623; 568/624
[58] Field of Search .......... 252/182.27; 528/405, 528/419, 421, 425; 568/619, 620, 623, 624

[56] References Cited

U.S. PATENT DOCUMENTS

| | | | |
|---|---|---|---|
| 5,030,550 | 7/1991 | Kawabe et al. | 252/182.27 |
| 5,192,813 | 3/1993 | Henn et al. | 521/174 |
| 5,198,532 | 3/1993 | Blytas et al. | 528/421 |
| 5,204,444 | 4/1993 | Frank et al. | 528/421 |

Primary Examiner—John Kight, III
Assistant Examiner—Rabon Sergent
Attorney, Agent, or Firm—Paul L. Marshall

[57] ABSTRACT

The present invention relates to a process for the preparation of a hard foam containing urethane groups or urethane and isocyanurate groups by the polyisocyanate polyaddition process, by reacting a) a polyoxypropylene- or polyoxyethylene-polyoxypropylene-polyol containing secondary hydroxyl groups, having a functionality of from 3.5 to 4.3, a hydroxyl number of from 350 to 650 and a viscosity of from 500 to 2,500 mPa·s at 23° C. and prepared by anionic polymerization of 1,2-propylene oxide or ethylene oxide and 1,2-propylene oxide onto an initiator molecule mixture containing, based on the total weight,
 a1) from 40 to 80% by weight of a hexanetetrol,
 a2) from 1 to 30% by weight of a hexanetriol,
 a3) from 0 to 35% by weight of glycerol and
 a4) from 0 to 15% by weight of sorbitol or mannitol, or a mixture thereof,
b) optionally, a low-molecular-weight chain extender and/or crosslinking agent with
c) an organic, modified or unmodified polyisocyanate; in the presence of
d) a blowing agent,
e) a catalyst and, optionally,
f) assistants and/or additives, and novel polyoxypropylene-polyols and polyoxyethylene-polyoxypropylene-polyols which can be used for this purpose.

3 Claims, No Drawings

POLYOXYPROPYLENE-POLYOLS AND POLYOXYPROPYLENE-POLYOXYETHYLENE-POLYOLS CONTAINING HYDROXYL GROUPS

This is a division, of application Ser. No. 07/694,621 filed May 2, 1991, now U.S. Pat. No. 5,192,813.

The present invention relates to a process for the preparation of a hard foam containing urethane groups or urethane and isocyanurate groups by the polyisocyanate polyaddition process, by reacting a) a polyoxypropylen- or polyoxyethylene-polyoxypropylene-polyol containing secondary hydroxyl groups, having a functionality or from 3.5 to 4.3, a hydroxyl number of from 350 to 650 and a viscosity of from 500 to 2,500 mPa·s at 23° C. and prepared by anionic polymerization of 1,2-propylene oxide or ethylene oxide and 1,2-propylene oxide onto an initiator molecule mixture containing, based on the total weight, a1) from 40 to 80% by weight of a hexanetetraol,
a2) from 1 to 30% by weight of a hexanetriol,
a3) from 0 to 35% by weight of glycerol and
a4) from 0 to 15% by weight of sorbitol or mannitol, or a mixture thereof, and, b) if desired, a low-molecular-weight chain extender and/or crosslinking agent with c) an organic, modified or unmodified polyisocyanate, in the presence of d) a blowing agent, e) a catalyst and, if desired, f) assistants and/or additives, and novel polyoxyppropylene-polyols and polyoxyethylene-polyoxypropylene-polyols which can be used for this purpose.

The preparation of foams containing urethane groups (abbreviated to PU foams below) having a wide range of mechanical properties by reacting a high-molecular-weight polyhydroxyl compound and, if desired, a low-molecular-weight chain extender or crosslinking agent with an organic polyisocyanate in the presence of a catalyst, blowing agent and, if desired, assistants and/or additives is known and is described in numerous patents and elsewhere in the literature. A suitable choice of synthesis components in this process allows the preparation of soft-elastic, semihard or hard PU foams.

Neither is the preparation of foams containing bonded urethane and isocyanurate groups novel. In this process, organic polyisocyanates are partially cyclized and polymerized in the presence of catalysts, and the resultant polyisocyanates containing isocyanurate groups (PIR) are then reacted with polyhydroxyl compounds in the presence of PU catalysts and blowing agents. In another procedure, the organic polyisocyanates are at the same time partially cyclized in the presence of excess amounts of polyhydroxyl compounds, catalysts with various actions and blowing agents, and the polyhydroxyl compounds are added onto the isocyanurate-containing and unmodified polyisocyanates formed.

A review of the preparation of hard PU foams and PU-PIR foams has been published, for example, in the monograph by J. H. Saunders and K. C. Frisch, High Polymers, Volume XVI, Polyurethanes, parts 1 and 2, Interscience Publishers, 1962 and 1964 respectively, and the Kunststoff-Handbuch, Volume VII, Polyurethane, Carl-Hanser Verlag, Munich, 1st Edition, 1966, and 2nd Edition, 1983.

Particularly successful high-molecular-weight polyhydroxyl compounds for the preparation of hard PU foams or PU-PIR foams of this type are polyester-polyols, polyoxyalkylene-polyols or mixtures of polyester- and polyoxyalkylene-polyols, for example those having a functionality of from 3 to 8 and a hydroxyl number of from 200 to 850.

According to GB-A-1,404,822, suitable polyester-polyols are prepared, for example, by polycondensing aliphatic dicarboxylic acids, preferably adipic acid, with polyhydric alcohols, eg. glycerol, trimethylolpropane and/or pentaerythritol.

GB-A-1,223,415 describes mixtures of aliphatic dicarboxylic acids and smaller amounts of aromatic dicarboxylic acids, e.g. phthalic acid, terephthalic acid or tetrachlorophthalic acid, for the preparation of suitable polyester-polyols.

According to DE-A-30 35 677 (U.S. Pat. No. 4,237,238), particularly successful polyhydroxyl compounds for the preparation of PU-PIR forms are those obtained by esterifying residues from the preparation of dimethyl terephthalate using a glycol having a molecular weight of from 60 to 400.

The polyoxyalkylene-polyols used for the preparation of hard PU foams are, in particular, polyoxy-propylene-polyols prepared using, as initiator molecules, mixtures of alkanolamines and polyhydric alcohols.

According to GB-A-1,154,161, suitable alkanolamines contain at least 3 reactive hydrogen atoms and suitable polyhydric alcohols contain 6 or more reactive hydrogen atoms, e.g. sucrose, sorbitol or methyl glucoside. By contrast, DE-C-1 543 305 (U.S. Pat. No. 3,332,934 and U.S. Pat. No. 3,424,700) describes, as initiator molecules, mixtures of triethanolamine and a coinitiator from the group comprising cane sugar, sorbitol and α-methyl glucoside; from 55 to 575 parts by weight of coinitiator are used per 100 parts by weight of triethanolamine, and the polyoxyalkylation is carried out in the absence of alkali metal hydroxide catalysts.

The processes described have the disadvantage, in addition to the high price for the polyester-polyols and their sensitivity to hydrolysis, of, in particular, the high viscosity of the polyester- and polyoxyalkylene-polyols, which, according to DE-C-1 543 305, have values of greater than 3,500 mPa·s, preferably greater than 18,000 mPa·s. Processing of polyhydroxyl compounds having such high viscosities in conventional foaming equipment, in particular by the two-component process, is only possible if considerable difficulties are overcome.

It is an object of the present invention to prepare hard PU foams or PU-PIR foams from formulations which have better processing properties in conventional equipment and high processing reliability over a broad range of reaction parameters without impairing the level of mechanical properties of known foams.

We have found that, surprisingly, this object is achieved by preparing the foams using a polyhydroxyl compound obtained by polyoxyalkylation of a specific starter molecule mixture.

The present invention thus provides a process for the preparation of a hard foam containing urethane groups or containing urethane and isocyanurate groups, by reacting a) at least one polyhydroxyl compound, and, b) if desired, a low-molecular-weight chain extender and/or crosslinking agent with c) an organic and/or modified organic polyisocyanate, in the presence of
d) a blowing agent,
e) a catalyst and, if desired,
f) assistants and/or additives, wherein the polyhydroxyl compound (a) used is a polyoxy-propylene-polyol or a polyoxyethylene-polyoxypropylenepolyol containing up to 30% by weight, based on the weight of the alkylene oxide units, of oxyethylene units bonded within the chain, containing secondary hydroxyl groups, having a functionality of from 3.5 to 4.3, a hydroxyl number of from 350 to 650 and a viscosity of from 500 to 2,500 mPa·s at 23° C., and prepared by anionic polymerization of 1,2-propylene oxide or ethylene oxide and 1,2-propylene oxide onto an initiator molecule mixture containing, based on the total weight, a1) from 40 to 80% by weight of a hexanetetraol,
a2) from 1 to 30% by weight of a hexanetriol,
a3) from 0 to 35% by weight of glycerol and
a4) from 0 to 15% by weight of sorbitol or mannitol, or a mixture thereof.

According to a preferred embodiment, the hard foam containing bonded urethane groups or containing bonded urethane and isocyanurate groups is prepared by a multistep process in which 1. in the first reaction step, 1,2-propylene oxide or ethylene oxide and 1,2-propylene oxide are polymerized onto an initiator molecule mixture having a functionality of from 3.5 to 4.3 and containing, based on the total weight, a1) from 40 to 80% by weight of a hexanetetraol,
a2) from 1 to 30% by weight of a hexanetriol,
a3) from 0 to 35% by weight of glycerol and
a4) from 0 to 15% by weight of sorbitol or mannitol, or a mixture thereof, at elevated temperature in the presence of at least one basic catalyst, in such an amount that the resultant polyoxypropylene-polyol or polyoxyethylene-polyoxypropylene-polyol containing secondary hydroxyl groups has a hydroxyl number of from 350 to 650 and a viscosity of from 500 to 2,500 mPa·s, and with the proviso that the polyoxyethylllene-polyoxypropylene-polyol contains up to 30% by weight, based on the weight of the alkylene oxide units, of oxyethylene units bonded within the chain, and 2. in a second reaction step,
a) the resultant polyoxypropylene-polyol or polyoxyethylene-polyoxypropylene-polyol and,
b) if desired, a low-molecular-weight chain extender and/or crosslinking agent are reacted with
c) an organic and/or modified organic polyisocyanate, in the presence of
d) a blowing agent,
e) a catalyst and, if desired,
f) assistants and/or additives.

Expedient and therefore preferred embodiments of the process according to the invention are described above.

The present invention furthermore provides novel polyoxypropylene-polyols or polyoxyethylene-polyoxy-propylene-polyols containing up to 30% by weight, based on the weight of the alkylene oxide units, of oxyethylene units bonded within the chain, containing secondary hydroxyl groups, having a functionality of from 3.5 to 4.3, a hydroxyl number of from 350 to 650 and a viscosity of from 500 to 2,500 mPa·s at 23° C., and prepared by anionic polymerization of 1,2-propylene oxide or ethylene oxide and 1,2-propylene oxide at elevated temperature onto an initiator molecule mixture containing, based on the total weight, a1) from 40 to 80% by weight of a hexanetetraol,
a2) from 1 to 30% by weight of a hexanetriol,
a3) from 0 to 35% by weight of glycerol and
a4) from 0 to 15% by weight of sorbitol or mannitol, or a mixture thereof, and a novel mixture of polyhydroxyl compounds for the preparation of polyisocyanate polyaddition products which comprises, based on the total weight of the polyhydroxyl compounds (a), ai) at least 10% by weight, preferably from 20 to 70% by weight, of at least one polyoxypropylene-polyol or at least one polyoxyethylene-polyoxypropylene-polyol having as described above, and
bi) up to 90% by weight, preferably from 80 to 30% by weight, of at least one conventional polyoxyalkylene-polyol having a functionality of from 2 to 8, preferably from 3 to 8, and a hydroxyl number of from 80 to 850, preferably from 300 to 800.

Since, as is known, polyoxyalkylene-polyols having a high functionality also have very high viscosity, it was surprising that the use of this specific initiator molecule mixture results in polyoxy-alkylene-polyols which have a considerably lower viscosity, in a hydroxyl number range which is conventional for hard foam polyether-polyols, and therefore can easily be processed in conventional foaming equipment for two-component systems. Good curing of the resultant foams is ensured by the sufficiently high functionality of the polyoxyalkylene-polyols of at least 3.5. The novel polyoxyalkylene-polyols are particularly suitable for the preparation of CFC-reduced or -free hard PU foams or PU-PIR foams since their use gives low-viscosity system components A which require no additional viscosity-reducing dilution with CFCs. It is furthermore surprising and advantageous that the foams prepared on the basis of the novel polyoxyalkylene-polyols, in spite of a lower functionality, in some cases cure more rapidly than foams made from conventional hard foam polyether-polyols, so that the mold residence time of PU foam moldings is frequently shortened and the space-time yield can be increased.

The following details apply to the preparation of the novel polyoxypropylene- or polyoxyethylene-polyoxypropylene-polyols which can be used according to the invention and to the other starting components which are suitable for the process according to the invention for the preparation of the hard foams containing urethane groups or containing urethane and isocyanurate groups.

a) The novel polyoxypropylene-polyols and polyoxyethylene-polyoxypropylene-polyols have, as stated above, essentially secondary hydroxyl groups, a functionality of from 3.5 to 4.3, preferably from 3.7 to 4.3, in particular from 3.9 to 4.1, a hydroxyl number of from 350 to 650, preferably from 400 to 600, in particular from 420 to 585, and a viscosity at 23° C. of from 500 to 2,500 mPa·s, preferably from 750 to 2,000 mPa·s, in particular from 780 to 1,900 mPa·s. If the polyoxyethylene-polyoxypropylene-polyols contain bonded oxyethylene units within the chain, their amount, based on the total weight of polymerized ethylene oxide and 1,2-propylene oxide, is up to 30% by weight, preferably from 3 to 30% by weight, in particular from 8 to 26% by weight.

The initiator molecules used according to the invention for the preparation of polyoxypropylene-polyols or polyoxyethylene-polyoxypropylene-polyols of this type are mixtures which contain or preferably comprise, based on the total weight, a1) from 40 to 80% by weight, preferably from 40 to 60% by weight, in particular from 45 to 55% by weight, of a hexanetetraol, a2) from 1 to 30% by weight, preferably from 3 to 20% by weight, in particular from 8 to 15% by weight, of a hexanetriol, a3) from 0 to 35% by weight, preferably from 0.01 to 35% by weight, in particular from 20 to 32% by weight, of glycerol and a4) from 0 to 15% by weight, preferably from 0.01 to 15% by weight, in particular from 5 to 12% by weight, of sorbitol or mannitol, or a mixture of sorbitol and mannitol.

A suitable initiator molecule mixture for the preparation of the polyoxypropylene- and polyoxy-ethylene-polyoxypropylene-polyols which can be used according to the invention can be obtained by mixing said polyhydric alcohols in the appropriate mixing ratios.

However, the initiator molecule mixture is preferably prepared by hydrogenolyzing sucrose in aqueous medium in the presence of a catalyst whose active material, calculated as the metal content, essentially comprises from 0 to 100% by weight of cobalt, from 0 to 85% by weight of copper and from 0 to 80% by weight of manganese, to give an alcohol mixture which contains, as essential constituents: sorbitol, mannitol, hexanetetraols, hexanetriols, glycerol, ethylene glycol, 1,2-propylene glycol, 1,2-butylene glycol and monohydric alcohols, such as ethanol, n-propanol and 2-butanol, subsequently removing the volatile constituents from this mixture by fractional distillation, and using the distillation residue as the initiator molecule mixture. In a particularly preferred process variant, the catalytically active material of the catalyst contains either only cobalt of said metals, cobalt, copper and manganese or at least two of these metals; in addition, inorganic polyacids and/or heteropolyacids may be added to the catalyst, and the sucrose solution to be hydrogenated may be treated with from 0.01 to 5% by weight of one or more basic compounds of metals from the first and second main group and group IIIA of the periodic table, published in the Handbook of Chemistry and Physics, 47th Edition, The Chemical Rubber Co. (2310 Superior Avenue, Cleveland, Ohio, 44114). Specific examples of basic compounds of said type are the hydroxides, oxides and/or carbonates of lithium, sodium, potassium, magnesium and/or calcium. The hydrogenation is expediently carried out at a hydrogen pressure of from 200 to 700 bar, preferably from 200 to 300 bar, and at from 180° to 280° C., preferably from 180° to 230° C. Processes for the catalytic hydrogenolysis of sucrose are described, for example, in EP-A-0 344 561 and DE-A-39 28 285; the descriptions of these subject-matters should be regarded as part of the present description.

The alcohol mixture obtained by catalytic hydrogenation and freed from catalyst is treated successively with a highly acidic ion exchanger and a highly basic ion exchanger to remove all the ions, and the volatile alcohols are then removed by fractional distillation.

The distillation residue which remains, which comprises hexanetetraols and hexanetriols and also possibly glycerol, sorbitol and/or mannitol, is preferably alkoxylated by anionic polymerization of alkylene oxides in the presence of alkali metal hydroxides, e.g. sodium hydroxide or potassium hydroxide, or alkali metal alkoxides, e.g. sodium methoxide, sodium ethoxide, potassium ethoxide, potassium isopropoxide or sodium butoxide as catalysts. To this end, the polyhydric alcohols in the initiator molecule mixture are partially converted into the corresponding alkoxides. Depending on the catalyst used, any water formed or any low-boiling alcohol formed is removed by distillation, and the 1,2-propylene oxide or ethylene oxide and then 1,2-propylene oxide are introduced into the reaction medium from 90° to 150° C., preferably from 100° to 130° C., at the rate at which the alkylene oxides react, for example over the course of from 4 to 30 hours, preferably from 6 to 12 hours, at atmospheric pressure or superatmospheric pressure of from 1.1 to 20 bar, preferably from 1.1 to 7 bar. When the alkoxylation is complete, the excess 1,2-propylene oxide or, in the case of the preparation of polyoxyethylene-polyoxypropylene-polyols, first the excess ethylene oxide and then, when the propoxylation is complete, the excess 1,2-propylene oxide, is removed by distillation at from 90° to 150° C. under reduced pressure, for example at from 0.01 to 20 mbar, preferably at from 0.1 to 10 mbar.

The polyoxyalkylene-polyols prepared, which preferably contain alkali metal ions, are expediently purified by conventional methods by adding organic acids, e.g. citric acid, acetic acid, formic acid, inter alia, or inorganic acids, e.g. sulfuric acid, phosphoric acid or carbonic acid, and, if desired, adsorbents.

To prepare the hard foams containing bonded urethane groups or containing bonded urethane and isocyanurate groups, the polyoxypropylene- or polyoxyethylene-polyoxypropylene-polyols which can be used according to the invention can be used as the only polyhydroxyl compound. In order to modify the mechanical properties of the foams or for technical reasons associated with processing, for example to reduce the viscosity of the polyhydroxyl compounds, it may be expedient to use, as the polyhydroxyl compound (a), a mixture which contains or preferably comprises, based on the total weight of (a), ai) at least 10% by weight, preferably from 20 to 70% by weight, of at least one polyoxy-propylene-polyol and/or at least one polyoxy-ethylene-polyoxypropylene-poly containing secondary hydroxyl groups and having a functionality, hydroxyl number and viscosity in the range required according to the invention, and prepared using the initiator module mixture which is necessary according to the invention, and aii) up to 90% by weight, preferably from 80 to 30% by weight, of at least one polyoxyalkylene-polyol having a functionality of from 2 to 8, preferably from 3 to 8, in particular from 3 to 6, and a hydroxyl number of from 80 to 850, preferably from 300 to 800, in particular from 350 to 700, as employed, as is known, for the preparation of hard PU foams.

The polyoxyalkylene-polyols (aii) which are suitable for this purpose can be prepared by conventional processes, for example by the above-described anionic polymerization in the presence of basic catalysts and using difunctional to octafunctional initiator molecules or by cationic polymerization using Lewis acids, such as antimony pentachloride, boron trifluoride etherate, inter alia, or bleaching earth as catalyst, from one or more alkylene oxides having from 2 to 4 carbon atoms in the alkylene radical, preferably ethylene oxide and/or, in particular, 1,2-propylene oxide.

In addition to the preferred ethylene oxide, mixtures of ethylene oxide and 1,2-propylene oxide and, in particular, 1,2-propylene oxide, examples of suitable alkylene oxides are tetrahydrofuran, 1,3-propylene oxide, 1,2- and 2,3-butylene oxide, systems oxide and epichlorohydrin. The alkylene oxides may be used individually, alternately one after the other or as mixtures.

Examples of suitable initiator molecules are water, inorganic dicarboxylic acids, such as succinic acid, adipic acid, phthalic acid and terephthalic acid, aliphatic and aromatic, unsubstituted or N-mono-, N,N- or N,N'-dialkyl-substituted diamines having from 1 to 4 carbon atoms in the alkyl radical, such as unsubstituted or mono- or dialkyl-substituted ethylenediamine, diethylenetriamine, triethylene-tetramine, 1,3-propylenediamine, 1,3- and 1,4-butylenediamine, 1,2-, 1,3-, 1,4-, 1,5- and 1,6-hexamethylenedimine, phenylenediamines, 2,3-, 2,4- and 2,6-tolylenediamine, and 4,4'-, 2,4'- and 2,2'-diaminodiphenylmethane.

Other suitable initiator molecules are alkanolamines, such as ethanolamine, diethanolamine, N-methyl- and N-ethylethanolmine, N-methyl- and N-ethyldiethanolamine and triethanola/nine, and ammonia.

Preference is given to polyhydric alcohols, in particular those containing three or more hydroxyl groups, or oxyalkylene glycols, such as ethanediol, 1,2-propanediol, 1,3-propanediol, diethylene glycol, dipropylene glycol, 1,4-butanediol, 1,6-hexanediol, glycerol, trimethylolpropane, pentaerythritol, sorbitol and sucrose.

Other suitable polyoxyalkylene-polyols (aii) are melamin/polyether-polyol dispersions, as described in EP-A-23 987 (U.S. Pat. No. 4,293,657), polymer/polyether-polyol dispersions, prepared from polyepoxides and epoxy resin curing agents in the presence of polyether-polyols, as described in DE 29 43 689 (U.S. Pat. No. 4,305,861), dispersions of aromatic polyesters in polyhydroxyl compounds, as described in EP-A-62 204 (U.S. Pat No. 4,435,537) or DE-A-33 00 474, dispersions of organic and/or inorganic fillers in polyhydroxyl compounds, as described in EP-A-11 751 (U.S. Pat. No. 4,243,755), polyurea/polyether-polyol dispersions as described in DE-A-31 25 402, tris(hydroxy-alkyl)isocyanurate/polyether-polyol dispersions, as described in EP-A-136 571 (U.S. Pat. No. 4,514,526), and crystallite suspensions, as described in DE-A-33 42 176 and DE-A-33 42 177 (U.S. Pat. No. 4,560,708); the statements in said patent publications are to be regarded as part of the patent description.

Particularly successful and therefore preferred polyoxyalkylene-polyols (aii) are sucrose-initiated polyoxyalkylene-polyols having a hydroxyl number of from 300 to 500, preferably from 350 to 450, based on 1,2-propylene oxide or 1,2-propylene oxide and ethylene oxide, sorbitol-initiated polyoxyalkylene-polyols having a hydroxyl number of from 400 to 600, preferably from 450 to 550, based on 1,2-propylene oxide or 1,2-propylene oxide and ethylene oxide, ethylenediamine-initiated polyoxyalkylene-polyols having a hydroxyl number of from 700 to 850, preferably from 750 to 800, based on 1,2-propylene oxide, and polyoxyalkylene-polyols having a hydroxyl number of from 400 to 600, preferably from 450 to 550, based on 1,2-propylene oxide or 1,2-propylene oxide and ethylene oxide and prepared using a mixture of sucrose and triethanolamine in a weight ratio of from 1:2 to 2:1 as initiator molecules.

The polyoxyalkylene-polyols (aii) may be used individually or in the form of mixtures.

b) The hard foams containing bonded urethane groups or containing bonded urethane and isocyanurate groups can be prepared in the presence or absence of chain extenders and/or crosslinking agents, but addition of them or mixtures of them may prove advantageous in order to modify the mechanical properties. The chain extenders and/or crosslinking agents are preferably alkanolamines and in particular diols and/or triols having molecular weights of less than 400, preferably from 60 to 300. Examples are alkanolmines, e.g. ethanolamine and/or isopropanolmine, dialkanolamines, e.g. diethanolamine, diiso-propanolamine and N-alkyldialkanolamines, e.g. N-methyl- and N-ethyldiethanolamine, trialkanol-amines, e.g. triethanolamine, triisooropanolmine and the products of the addition of ethylene oxide or 1,2-propylene oxide with alkylenediamines having from 2 to 6 carbon atoms in the alkylene, e.g. N,N,N',N'-tetra(2-hydroxyethyl)ethylenedimine and N,N,N',N'-tetra(2-hydroxypropyl)ethylenediamine, aliphatic, cycloaliphatic and/or araliphatic diols having from 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and, preferably, 1,4-butanediol, 1,6-hexanediol and bis(2-hydroxyethyl)hydroquinone, triols, such as 1,2,4- and 1,3,5-trihydroxycyclohexane, glycerol and trimethylolpropane, and low-molecular-weight hydroxyl-containing polyoxyalkylene ethers based on ethylene oxide and/or 1,2-propylene oxide, and aromatic divines, e.g. tolylenediaunines and/or diaminodiphenylmethanes, and the abovementioned alkanolmines, diols and/or triols as initiator molecules.

If chain extenders, crosslinking agents or mixtures thereof are used to prepare the hard foams, they are expediently employed in an amount of from 0 to 20% by weight, preferably from 2 to 5% by weight, based on the weight of the polyhydroxyl compound.

c) Suitable organic and/or modified organic polyisocyanates are conventional aliphatic, cycloaliphatic, araliphatic and, preferably, aromatic polyisocyanates.

The following may be mentioned as examples of organic polyisocyanates: alkylene diisocyanates having from 4 to 12 carbons in the alkylene, such as 1,12-dodecane diisocyanate, 2-ethyltetra-methylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate, and any desired mixtures of these isomers, 1-isocyanato-3,3,5-trimethyl-5-isocyanatomethylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and, preferably, aromatic diisocyanates and polyisocyanates, e.g. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenylpoly-methylene polyisocyanates, mixtures of 4,4'-, 2,4'- and 2,2'-diphenylmethane diisocyanates, and polyphenylpolymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, iie. products obtained by partial chemical reaction of organic diisocyanates and/or polyisocyanates. Specific examples are ester-, urea-, biuret-, allophanate-, carbodiimide-, isocyanurate- and/or urethane-containing diisocyanates and/or polyisocyanates. Individual examples are urethane-containing organic, preferably aromatic polyisocyanates containing from 33.6 to 15% by weight, preferably from 28 to 22% by weight, of NCO, based on the total weight, for example 4,4'-diphenylmethane diisocyanate or 2,4- or 2,6-tolylene diisocyanate modified by means of low-molecular-weight diols, triols, dialkylene glycols, trialkylene glycols or polyoxyalkylene glycols having molecular weights of up to 1500, specific examples of di- and polyoxyalkylene glycols, which can be employed individually or as mixtures, being diethylene glycol, dipropylene glycol, polyoxyethylene-, polyoxypropylene- and polyoxypropylene-polyoxyethylene glycols or -triols. NCO-containing prepolymers containing from 25 to 9% by weight, preferably from 21 to 14% by weight, of NCO, based on the total weight, and prepared from the polyoxyalylenepolyols described above and 4,4'-diphenylmethane diisocyanate, mixtures of 2,4'- and 4,4'-diphenylmethane diisocyanate, 2,4'- and/or 2,6-tolylene diisocyanates or crude MDI are also suitable. Furthemore, liquid, carbodiimide- and/or isocyanurate ring-containing polyisocyanates containing from 33.6 to 15% by weight, preferably from 28 to 22% by weight, of NCO, based on the total weight, for example based on 4,4'-, 2,4'- and/or 2,2'-diphenylmethane diisocyanate and/or crude MDI containing 31±2% by weight of NCO and/or 2,4- and/or 2,6-tolylene diisocyanate, have also proven successful.

The modified polyisocyanates can, if desired, be mixed with one another or with unmodified organic polyisocyanates, e.g. 2,4'- and 4,4'-diphenylmethane diisocyanate, crude MDI, 2,4- and/or 2,6-tolylene diisocyanate.

Particularly suitable organic polyisocyanates, and thus those which are preferably used for the preparation of the hard PU foes, are crude MDI or mixtures of modified urethane-containing and/or isocyanurate-containing organic polyisocyanates containing from 28 to 22% by weight of NCO, those based on advantageously 4,4'-diphenylmethane diisocyanate, diphenylmethane diisocyanate isomer mixtures or crude MDI and, in particular, crude MDI containing 31±2% by weight of NCO and from 30 to 80% by weight, preferably from 30 to 55% by weight, of diphenylmethane-diisocyanate isomers.

d) The blowing agents (d) which can be used for the preparation of the hard foams containing urethane groups or containing urethane and isocyanurate groups preferably include water, which reacts with isocyanate groups to form carbon dioxide. The amount of water which is expediently employed is from 0.1 to 6.5 parts by weight, preferably from 1.0 to 5.5 parts by weight, in particular from 2.0 to 5.0 parts by weight, based on 100 parts by weight of the high-molecular-weight polyhydroxyl compound (a).

It is also possible to employ physical blowing agents mixed with water or exclusively physical blowing agents. Suitable compounds are liquids which are inert toward the organic, modified or unmodified polyisocyanates (c) and have boiling points below 100° C., preferably below 50° C., in particular from −50° C. to 30° C., at atmospheric pressure, so that they evaporate during the exothermic polyaddition reaction. Examples of preferred liquids of this type are hydrocarbons, such as n- and isopentane, technical-grade pentane mixtures, n- and isobutane and propane, ethers, such as foam, dimethyl ether and diethyl ether, ketones, such as acetone and methyl ethyl ketone, esters, such as ethyl acetate and methyl formate, and preferably halogenated hydrocarbons, such as methylene chloride, difluoromethane, trichlorofluoromethane, dichlorodifluoromethane, dichloromonofluoromethane, 1,1,1-dichlorofluoroethane, 1,1,1-chlorodifluoroethane, dichlorotetrafluoroethane, tetrafluoroethane, 1,1,2-trichloro-1,2,2-trifluoroethane and heptafluoropropane, and noble gases, e.g. krypton. Mixtures of these low-boiling liquids with one another and/or with other substituted or unsubstituted hydrocarbons can also be used.

The necessary amount of physical blowing agent can be determined in a simple manner depending on the foam density required and is from approximately 10 to 30 parts by weight, preferably from 14 to 22 parts by weight, per 100 parts by weight of the high-molecular-weight polyhydroxyl compound (a), its amount being reduced proportionately if water is also used. It may be expedient to mix the modified or unmodified polyisocyanate (c) with the physical blowing agent and thereby to reduce its viscosity.

e) The catalyst (e) used is, in particular, a compound which greatly accelerates the reaction of the hydroxyl-containing compound of component (a) and, if used, (b) with the polyisocyanate. Suitable compounds are organometallic compounds, preferably organic compounds, such as tin(II) salts of organic carboxylic acids, e.g. tin(II) acetate, tin(II) octanoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate. The organometallic compounds are employed alone or preferably in combination with strongly basic amines. Specific examples are amidines, such as 2,3-dimethyl-3,4,5,6-tetrahydro-pyrimidine, tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, pentamethyl-diethylenetriamine, tetramethyl-diaminoethyl ether, bis(dimethylaminopropyl)urea, dimethylpiperazine, 1,2-dimethylimidazole, 1-azabicyclo[3.3.0]octane and preferably 1,4-diazabicyclo[2.2.-2]octane, and alkanolamine compounds, such as triethanolamine, triisopropanolamine, N-methyl- and N-ethyl-diethanolamine and dimethylethanolimine.

Other suitable catalysts are tris(dialylaminoalkyl)-s-hexahydrotriazines, in particular tris(N,N-dimethylaminopropyl)-s-hexahydrotriazine, tetra-alkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of long-chain fatty acids having from 10 to 20 carbon atoms and possibly having pendant OH groups. From 0.001 to 5% by weight, in particular from 0.05 to 2% by weight, of catalyst or catalyst combination, based on the weight of the polyhydroxyl compound (a), is preferably used.

f) It is also possible to add, if desired, assistants and/or additives (f) to the reaction mixture for the preparation of the hard PU or PU-PIR foams. Specific examples are surfactants, foam stabilizers, cell regulators, fillers, dyes, pigments, flameproofing agents, hydrolysis-protection agents, and fungi-static and bacteriostatic substances.

Examples of suitable surfactants are compounds which serve to support homogenization of the starting materials and may also be suitable for regulating the cell structure. Specific examples are emulsifiers, such as the sodium salts of castor oil sulfates, or of fatty acids, and the salts of fatty acids with amines, for example diethylamine oleate, diethanolamine stearate and diethanolamine ricinoleats, salts of sulfonic acids, e.g. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric polyacrylates containing polyoxyalkylene and fluoroalkane radicals as side groups. The surfactants are usually used in amounts of from 0.01 to 5 parts by weight, based on 100 parts by weight of the polyhydroxyl compound (a).

For the purposes of the invention, fillers, in particular reinforcing fillers, are conventional organic and inorganic fillers, reinforcing agents, weighting agents, agents for improving the abrasion behavior in paints, coating agents etc. Specific examples are inorganic fillers, such as silicate minerals, for example phyllosilicates, such as antigorite, serpentine, hornblends, amphiboles, chrysotile and talc; metal oxides, such as kaolin, aluminum oxides, aluminum silicate, titanium oxides and iron oxides, metal salts, such as chalk, baryte and inorganic pigments, such as cadmium sulfide and zinc sulfide, and glass particles. Examples of suitable organic fillers are carbon black, melamine, expandable graphite, colophony, cyclopentadienyl resins and graft polymers.

The inorganic and organic fillers may be used individually or as mixtures and are advantageously introduced into the reaction mixture in amounts of from 0.5 to 50 % by weight, preferably from 1 to 40 % by weight, based on the weight of components (a) to (c).

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate.

In addition to the abovementioned halogen-substituted phosphates, it is also possible to use inorganic flameproofing agents, such as red phosphorus, aluminum oxide hydrate, antimony trioxide, arsenic oxide, ammonium polyphosphate and calcium sulfate, and cyanuric acid derivatives, e.g. melamine, or mixtures of two or more flameproofing agents, e.g. ammonium polyphosphates and melamine, and also, if desired, starch and/or expandable graphite in order to flameproof the hard PU foams prepared according to the invention. In general, it has proven expedient to use from 5 to 50 parts by weight, preferably from 5 to 25 parts by weight, of said flameproofing agents or mixtures per 100 parts by weight of components (a) to (c).

Further details on the other conventional auxiliaries and additives mentioned above can be obtained from the specialist literature, for example from the monograph by J. H. Saunders and K. C. Frisch, High Polymers, Volume XVI, Polyurethanes, Parts 1 and 2, Interscience Publishers, 1962 and 1964 respectively, or the Kunststoff-Handbuch, Polyurethane, Volume VII, Carl-Hanser-Verlag, Munich, Vienna, 1st and 2nd editions, 1966 and 1983.

To prepare the hard PU foams, the organic, modified or unmodified polyisocyanate (c), the high-molecular-weight polyhydroxyl compound having two or more reactive hydrogen atoms (a) and, if desired, the chain extender and/or crosslinking agent (b) are reacted in such an amount that the equivalence ratio between the NCO groups of the polyisocyanate (c) and the total number of reactive hydrogen atoms of components (a) and, if used, (b) is from 0.85 to 1.25:1, preferably from 0.95 to 1.15:1, in particular from about 1.0 to 1.10:1. If the urethane-containing hard foams are modified by the formation of isocyanurate groups, for example in order to increase the flame resistance, a ratio between the NCO groups of the polyisocyanate (c) and the total number of reactive hydrogen atoms in components (a) and, if used, (b) of from 1.5 to 10:1, preferably from 1.5 to 6:1, is usually used.

The hard PU or PU-PIR foams can be prepared batchwise or continuously by the prepolymer process or preferably by the one-shot process using conventional mixers.

It has proven particularly advantageous to use the two-component process and to combine the starting components (a), (d), (e) and, if desired, (b) and (f) in component (A) and to use as component (B) the organic polyisocyanate, the modified polyisocyanate (c) or a mixture of said polyisocyanates and, if desired, a blowing agent (d).

The starting components are mixed at from 15 to 90° C., preferably from 20 to 35° C., and introduced into an open mold with or without temperature control, in which the reaction mixture is allowed to expand essentially under atmospheric pressure in order to avoid a compacted peripheral zone or the mold is closed after filling and the reaction mixture is allowed to expand with compaction, for example with a degree of compaction of from 1.1 to 6, preferably from 1.2 to 4, in particular from 1.2 to 2, in order to form moldings. To form composite elements, the upper side of an outer layer is expediently coated, for example by pouring or spraying, with the foamable reaction mixture, which is allowed to expand and then, after coating with a second outer layer, to cure to form a hard PU or PU-PIR foam.

The hard PU and PU-PIR foams prepared by the process according to the invention preferably have, after free-foaming, densities of from 20 to 50 g/l and, after mold-foaming, from 30 to 45 g/l. The closed-cell, urethane-containing polyisocyanurate foams prepared from the polyoxypropylene-polyols or polyoxyethylene-polyoxy-propylene-polyols according to the invention and possibly containing flameproofing agents meet, for example, the DIN 4102, Part 2, fire-resistance requirements (B2 in the small burner test).

The hard PU or PU-PIR foams are preferably used as the heat-insulating intermediate layer in composite elements and for foam-filling cavities in refrigeration equipment casings, in particular for refrigerators and chest freezers. The products are furthermore suitable for insulating warmed materials, as pipe shells and as sheets.

The mixtures of polyhydroxyl compounds, comprising at least 10% by weight of at least one polyoxy-propylene- or polyoxyethylene-polyoxypropylene-polyol (ai) which can be used according to the invention, or a mixture thereof, and up to 90% by weight of at least one conventional polyoxyalkylene-polyol (aii) having a functionality of from 2 to 8 and a hydroxyl number of from 80 to 850 are used to produce polyisocyanate poly-addition products.

EXAMPLES

Preparation of the polyoxypropylene- and polyoxyethylene-polyoxypropylene-polyols which can be used according to the invention

Example 1

1,570 g of an initiator molecule mixture comprising, based on the total weight,
- 50% by weight of hexanetetraols,
- 10% by weight of hexanetriols,
- 30% by weight of glycerol and
- 10% by weight of a sorbitol/mannitol mixture in the weight ratio 9:1 was mixed in a 10 liter stirred autoclave with 37.4 g of a 45% strength by weight aqueous potassium hydroxide solution, and the polyhydric alcohols were converted into the corresponding potassium alkoxides at 100° C. under reduced pressure (1 mbar) while removing the water by distillation.

4,040 g of 1,2-propylene oxide was then introduced into the reaction mixture at 110° C. and atmospheric pressure over a period of 8 hours.

After the unreacted 1,2-propylene oxide had been removed by distillation at 110° C. and 5 mbar, the reaction mixture was allowed to cool to approximately 90° C., 200 g of magnesium silicate and 100 g of water were added, and the solids were subsequently filtered off. The water was removed by distillation under reduced pressure (1 mbar), and the polyoxyrpropylene-polyol was stabilized using 2,6-di-tert-butyl-p-cresol.

A polyoxypropylene-polyol having a functionality of 4, a hydroxyl number of 407, a viscosity of 1,043 mPa·s at 23° C., a residual water content of 0,015% by weight and a pH of 8.6 was obtained.

Example 2

The procedure was similar to that of Example 1, but the 4,040 g of 1,2-propylene oxide were replaced by only 2,920 g.

A polyoxypropylene-polyol having a functionality of 4, a hydroxyl number of 560, a viscosity of 1,865 mPa·s at 23° C., a residual water content of 0.02% by weight and a pH of 8.55 was obtained.

Example 3

1,570 g of the initiator molecule mixture described in Example 1 was first oxyethylated in 3 hours by a method similar to that of Example 1 using 1,012 g of ethylene oxide. After the unreacted ethylene oxide had been removed at 110° C. and 1 mbar, the reaction mixture was oxypropylated over the Course of 6 hours at 110° C. under atmospheric pressure using 3,028 g of 1,2-propylene oxide.

The reaction mixture was worked up by a method similar to that of Example 1.

A polyoxyethylene (25% by weight)-polyoxypropylene(75% by weight)-polyol containing essentially secondary hydroxyl groups, and having a functionality of 4, a hydroxyl number of 474, a viscosity of 796 mPa·s at 23° C., a residual water content of 0.015% by weight and a pH of 8.6 was obtained.

Example 4

The procedure was similar to that of Example 3, but the alkylene oxides used were first 920 g of ethylene oxide and subsequently 2,000 g of 1,2-propylene oxide.

A polyoxyethylene (25% by weight)-polyoxypropylene(75% by weight)-polyol containing essentially secondary hydroxyl groups and having a functionality of 4, a hydroxyl number of 585, a viscosity of 1,257 mPa·s at 23° C., a residual water content of 0.01% by weight and a pH of 8.5 was obtained.

Preparation of hard foams containing urethane groups

Examples 5 to 8 and Comparative Examples I and II

The examples and comparative examples were carried out using the high-molecular-weight polyhydroxyl compounds listed in Table I.

TABLE I

| Polyhydroxyl compound | Functionality | OH No. | Viscosity [mPa.s] at 23° C. |
| --- | --- | --- | --- |
| Polyol A, prepared as in Example 1 | 4 | 407 | 1043 |
| Polyol B, prepared as in Example 2 | 4 | 560 | 1865 |
| Polyol C, prepared as in Example 3 | 4 | 474 | 796 |
| Polyol D, prepared as in Example 4 | 4 | 585 | 1257 |
| Polyol E, prepared by polyaddition of 1,2-propylene oxide onto an initiator molecule mixture comprising sucrose, glycerol and water | 4.3 | 400 | 5500 |
| Polyol F, prepared by polyaddition of 1,2-propylene oxide onto glycerol as the initiator molecule | 3.0 | 400 | 365 |
| Polyol G, prepared by polyaddition of 1,2-propylene oxide onto an initiator molecule mixture comprising sucrose and triethanolamine | 4.6 | 500 | 7000 |
| Polyol H, prepared by polyaddition of 1,2-propylene oxide onto 1,2-propylene glycol | 2 | 105 | 150 |

Component A:
A mixture comprising
- 10 parts by weight of polyol H,
- 25 parts by weight of polyol G,
- 5 parts by weight of dipropylene glycol,
- 1.5 parts by weight of a silicone as foam stabilizer (Polyurax ® SR 321 from BP Chemicals), 0.1 part by weight of bis(dimethylaminoethyl) ether,
1.0 part by weight of N,N,N',N'-tetramethylhexamethylenediamine,
3.3 parts by weight of water,
18 parts by weight of trichlorofluoromethane and
53 parts by weight of one of polyols A to F Component B:

A mixture of diphenylmethane diisocyanates and polyphenyl-polymethylene polyisocyanates containing 31% by weight of NCO and having a viscosity of about 200 mPa·s at 23° C.

Components A and B at 23° C. were mixed vigorously at 23° C. for 10 seconds by means of a high-speed stirrer (1,200 rpm), and the mixture was transferred into a 1.1 liter polystyrene beaker, where it was allowed to expand.

The following properties were determined for the urethane-containing hard foam prepared in this way:
the initiation and setting time,
the overall density in accordance with DIN 53420,
the setting level, i.e. the relative level at the time of setting, using an LAM 80 airborne sound distance measuring instrument from Krautkräer, Grossburgwedel, and
the increase in compressive strength as a function of time using a T 2001 tension/compression tester from Lloyd Instruments, Offenbach am Main.

In a second series of experiments, four times the amount of components A and B were mixed vigorously in the same way, and the reaction mixture was allowed to expand freely in a box measuring 20×20×20 cm.

The foam core density (in accordance with DIN 53420) and the compressive strength (in accordance with DIN 53 421) were determined on the urethane-containing hard foam prepared in this way after storage for 24 hours at room temperature (23° C.).

The polyols A to F used, the amount of component B employed and the abovementioned properties measured on the foams prepared are shown in Table II.

TABLE II

|  | Example | | | | Comparative Example | |
|---|---|---|---|---|---|---|
|  | 5 | 6 | 7 | 8 | I | II |
|  | [Type] | | | | | |
|  | A | B | C | D | E | F |
| Polyol | [parts by weight] | | | | | |
| Component B | 154 | 154 | 154 | 154 | 154 | 154 |
| Initiation time [s] | 17 | 19 | 17 | 18 | 15 | 16 |
| Setting time [s] | 63 | 68 | 60 | 56 | 60 | 59 |
| Overall density in accordance with DIN 53420 [g/l] | 31.8 | 31.1 | 31.1 | 31.9 | 31.7 | 31.3 |
| Setting level [%] | 84.7 | 81.8 | 83.6 | 81.8 | 82.3 | 83.2 |
| Compressive strength after | | | | | | |
| 2.5 min [N] | 15.8 | 23.1 | 20.1 | 26.7 | 20.9 | 14.7 |
| 3.5 min [N] | 38.4 | 50.5 | 40.4 | 54 | 48 | 32.4 |
| 4.5 min [N] | 61.9 | 73.1 | 64.7 | 76.1 | 71 | 48 |
| Compressive strength | | | | | | |
| parallel [kPa] | 167 | 171 | 145 | 128 | 175 | 118 |
| perpendicular [kPa] | 69 | 86.4 | 65.6 | 53.6 | 67.6 | 47.3 |
| Foam core density in accordance with DIN 53420 [g/l] | 28.6 | 28.2 | 28.3 | 28.5 | 29.5 | 30.2 |

As Table II shows, the hard PU foams prepared in accordance with Examples 5 to 8 from the polyhydroxyl compounds which can be used according to the invention and which have a lower calculated functionality and have a considerably lower viscosity have in some cases better curing behavior, coupled with improved demolding behavior, which is important for numerous areas of application, compared with the foam of Comparative Example I based on the conventional polyol E.

The foam of Comparative Example II prepared in the presence of the low-viscosity polyol F had worse curing behavior and, after several days, showed evidence of shrinkage. Polyol F is therefore unsuitable for blending with high-viscosity polyoxypropylene-polyols based on sucrose/triethanolamine mixtures as initiator molecules, which are usually used for the preparation of low-density hard PU foams which can be rapidly demolded.

Example 9

Component A:
A mixture comprising
25 parts by weight of polyol B,
54 parts by weight of polyol E,
10 parts by weight of polyol H,
5 parts by weight of dipropylene glycol,
1.5 parts by weight of a silicone as foam stabilizer (Polyurax® SR 321 from BP Chemicals),
0.25 parts by weight of bis(dimethylaminoethyl) ether,
1.8 parts by weight of N,N,N',N'-tetramethylhexamethylenediamine,
3.3 parts by weight of water and
20 parts by weight of trichlorofluoromethane.

Component B:
As in Examples 5 to 8.

154 parts by weight of component B were added at 23° C. to component A, the components were mixed vigorously for 10 seconds using a high-speed stirrer (1,200 rpm), and the reaction mixture was transferred into a 1.1 liter polystyrene beaker, where it was allowed to expand.

Comparative Example III

The procedure was similar to that of Example 9, but, in component A, polyol B was replaced by polyol G and the 1.8 parts by weight of N,N,N',N'-tetramethylhexamethylenedimine were replaced by only 1.5 parts by weight.

The following properties of the urethane-containing hard foams prepared in this way were determined as in Examples 5 to 8:
the initiation and setting time,
the overall density,
the setting level and
the increase in compressive strength as a function of time.

The values measured for the hard PU foams are shown in Table III.

TABLE III

|  | Example 9 | Comparative Example III |
|---|---|---|
| Initiation time [s] | 12 | 11 |
| Setting time [s] | 55 | 53 |
| Density [s/l] | 27.1 | 27.1 |
| Setting level [%] | 87.4 | 85.9 |
| Compressive strength after | | |
| 2 min [N] | 14.2 | 13.2 |
| 3 min [N] | 36 | 34.8 |
| 4 min [N] | 58.3 | 54.2 |
| 5 min [N] | 71.5 | 67.5 |

The hard PU foam prepared in Example 9 has not only improved curing behavior, but at the same time better flow behavior, measured by the setting level, than the foam of Comparative Example III. This property profile is important for areas of application in which molds having spatial shapes which are difficult to fill must be filled rapidly with foamable formulations and the moldings produced must be demolded immediately in order to achieve short mold residence times.

We claim:

1. A novel polyoxypropylene-polyol or a polyoxyethylene-polyoxypropylene-polyol containing up to 30% by weight, based on the weight of the alkylene oxide units, of oxyethylene units bonded within the chain, containing secondary hydroxyl groups, having a functionality of from 3.5 to 4.3, a hydroxyl number of from 350 to 650 and a viscosity of from 500 to 2,500 mPa·s at 23° C., and prepared by anionic polymerization of 1,2-propylene oxide or ethylene oxide and 1,2-propylene oxide at elevated temperature onto an initiator molecule mixture containing, based on the total weight of the initiator molecule mixture,
   a1) from 40 to 80% by weight of a hexanetetrol,
   a2) from 1 to 30% by weight of a hexanetriol,
   a3) from 0 to 35% by weight of a glycerol and
   a4) from 0 to 15% by weight of sorbitol or mannitol, or a mixture thereof.

2. A novel polyoxypropylene-polyol or polyoxyethylene-polyoxypropylene-polyol as claimed in claim 1, wherein the initiator molecule mixture consists of, based on the total weight of the initiator molecule mixture,
   a1) from 40 to 80% by weight of a hexanetetrol,
   a2) from 1 to 30% by weight of a hexanetriol,
   a3) from 0 to 35% by weight of glycerol and
   a4) from 0 to 15% by weight of sorbitol or mannitol, or a mixture thereof.

3. A mixture of polyhydroxyl compounds for preparing polyisocyanate polyaddition products, which comprises, based on the total weight of the polyhydroxyl compounds (a),
   ai) at least 10% by weight of at least one polyoxypropylene-polyol or at least one polyoxyethylene-polyoxypropylene-polyol containing up to 30% by weight, based on the weight of the alkylene oxide units, of oxyethylene units bonded within the chain, containing secondary hydroxyl groups, having a functionality of from 3.5 to 4.3, a hydroxyl number of from 350 to 650 and a viscosity of from 500 to 2,500 mPa·s at 23° C., and prepared by anionic polymerization of 1,2-propylene oxide or ethylene oxide and 1,2-propylene oxide onto an initiator molecule mixture containing, based on the total weight of the initiator molecule mixture,
     a1) from 40 to 80% by weight of a hexanetetrol,
     a2) from 1 to 30% by weight of a hexanetriol,
     a3) from 0 to 35% by weight of glycerol and
     a4) from 0 to 15% by weight of sorbitol or mannitol, or a mixture thereof,
   and
   aii) up to 90% by weight of at least one polyoxyalkylene-polyol, different from (ai) having a functionality of from 2 to 8 and a hydroxyl number of from 80 to 850.

* * * * *